F. P. PETERSON.
ART OF THE CONDENSATION OF GASES OR VAPORS INTO THEIR LIQUID FORMS.
APPLICATION FILED JULY 5, 1911.
1,031,664.
Patented July 2, 1912.
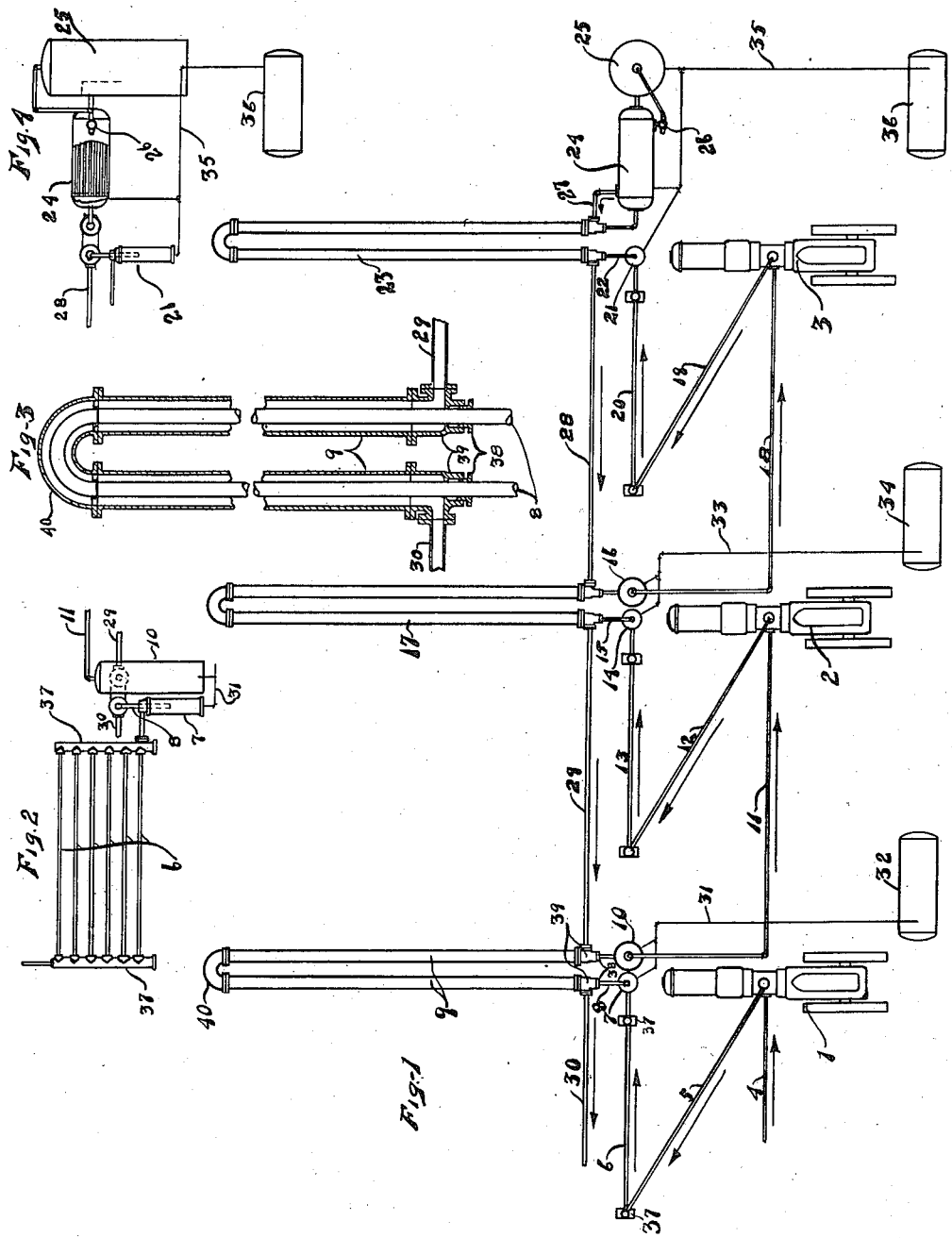
Witnesses
B. M. Hartman
Inventor
Franklin P. Peterson
Attorney

UNITED STATES PATENT OFFICE.

FRANKLIN P. PETERSON, OF GROVE CITY, PENNSYLVANIA, ASSIGNOR, BY MESNE ASSIGNMENTS, TO THE AMERICAN GASOL COMPANY, OF PITTSBURGH, PENNSYLVANIA, A CORPORATION OF WEST VIRGINIA.

ART OF THE CONDENSATION OF GASES OR VAPORS INTO THEIR LIQUID FORMS.

1,031,664.    Specification of Letters Patent.    Patented July 2, 1912.

Application filed July 5, 1911. Serial No. 636,962.

*To all whom it may concern:*

Be it known that I, FRANKLIN P. PETERSON, a citizen of the United States, residing at Grove City, in Mercer county, State of Pennsylvania, have invented certain new and useful Improvements in the Art of the Condensation of Gases or Vapors into Their Liquid Forms.

My present invention relates to the process for the separation of the several families of a series of condensable gases or vapors, such as the families or compounds of hydrocarbon gases which flow from petroleum oil or gas wells, into their respective fractions, as described in refinery distillation processes, having more or less constant boiling points and compound structures.

In the process at present employed and known, for the most part, as methods for extraction of gasolene from natural gas, it has developed that when high pressures are used in the condensers that are employed, certain of the low boiling point fractions in the compound gases treated are condensed and held in mechanical combination with the higher specific gravity, higher boiling point liquids which are sought. This result is undesirable from a view point of producing and marketing the heavier liquids. The very volatile lighter fractions held in combination with the heavier product has a tendency when confined in a retainer to create undesirable pressure on any slight increases of temperature. It has a tendency to create ebullition strong enough to throw a portion of the contents out of a vessel if the same be suddenly opened and the vapor pressure released. It is, furthermore, desirable to separate for more valuable uses those fractions which can be readily liquefied and which have such low boiling points as to be volatile at all ordinary temperatures.

Referring to the accompanying drawing: Figure 1 is a general arrangement plan view of a condensing plant arranged to separate the condensate obtainable into fractions or stages. Fig. 2 shows a side elevation of a portion of the condensing equipment, composed of cast iron, vertically disposed manifolds or headers, 37, and cooling pipes, 6, communicating between the headers. Fig. 3 is a horizontal sectional view of a form of cooler designed to utilize the heat reaction of the rapidly expanding residue gas as a cooling medium to extract heat from the gas under treatment for separation of condensable vapors. The part this detail plays in the operation will be described further on. Fig. 4 is a side elevation of details 21, 23, 24, 25 and 36 in plan and shows detail 24 partially in section.

It is obvious that various differing details of construction and of cooling contrivances might be employed to the end that I seek but, for convenience of illustration, I have selected the combination of details which have been found effectual in performing cooling and condensing functions in various arts involving such treatment of gases and, in particular, the art of condensing the heavier portions of natural gas from oil bearing strata into liquids.

I will describe the process referring to the drawing as follows: 1 is a compressor and this detail undertakes to compress the gas medium being treated through the first stage of compression. The gas is taken into the compressor cylinder through pipe 4 and discharged through pipe 5 into the header 37, (shown in elevation in detail in Fig. 2), from whence it is distributed in several streams through cooling pipes 6, wherein the temperature may be controlled to any desired degree within those ranges involved by the climatic state and the nature of the compressor and extent of first stage compression. The temperature may be controlled by the use of water flowing over the pipes or by the free or restricted circulation of air. The gas, on leaving the collecting header, 37, enters the traps 7, where any liquid present is separated and drawn off into tank 32. Leaving the trap through pipe 8, the gas passes further through the expansion cooling coil 9. From the detail section shown in Fig. 3 we can follow the path of the gas under compression through the internal pipe 8 the length of the pipe and return through the double wall return bend 40, delivering into the tank 10. The trap 7 and the tank 10 serve to separate the accumulated liquid condensed in the first stage of compression, from whence it is delivered into the stock tank 32. From the tank 10 the gas is delivered to the intake of the second stage compressor 2, and through the compressor and the connecting pipe 12 into the second stage condensing coil 13, the trap 14, the expansion cooling coil 17, the accumulator tank 16, and into the third stage compressor 3. In this second stage the same method of separation of liquid is followed as in the first stage, the condensate being gathered and stored in tank 34. The gas is then made to pass through the third stage, or as many stages of compression as may be desired for as many separations or fractions of condensation as are required and the condensates may be revaporized and passed through the process as many times as may be necessary for obtaining any desired constancy of boiling point.

After the last compression the gas passes by the pipe 18 to the cooling coil 20, thence by the pipe 22, trap 21 through the cooling coil or loop 23. From the loop 23 the gas passes to a tubular condenser 24 shown partly in section in Fig. 4. This condenser is of ordinary form having headers near the ends connected by tubes. The gas enters from the loop 23 to one of the end spaces, passes through the tubes to the opposite end and the condensates are delivered by way of the pipe 35 to the storage tank 36. The gas passes through the tubes of the chamber 24 and into the final accumulator tank 25. From tank 25, the gas, now considered residue, is released, preferably intermittently through some form of pop or spring relief valve, and discharged into the chamber 24, as above stated, at the point 26. The rapidly expanding gases from a high pressure to a low pressure and from a smaller to a greater volume produce an endo-thermic or heat absorbing reaction and the final re-absorption of heat into the expanding residue gas is carried as far as may be found efficient by means of the expansion cooling coils 23, 17, 9, etc. These coils, shown in detail in Fig. 3, make this part of the treatment quite clear. The expanding gas, now very much reduced in pressure, after leaving 24, by means of pipe 27, is made to enter the outer casings of the expansion coils 23 which are similar in construction to the expansion coils, 9, shown in the sectional detail in Fig. 3 and pass in series from one coil to another of the different stages around the column of gas under pressure in the inner pipes and in the opposite direction to the travel of the condensing gas.

The separation of condensate from the final stage is effected by means of drainage connections from the trap 21, the expansion chamber 24 and the final accumulator tank 25 by a tank 35 into the final storage tank 36. In conducting these stage operations, such pressures and temperatures may be produced and maintained in the several separate stages as conform to the critical temperatures and pressures of the different compounds or fractions present in the complex gas and which are desired to be separated out more or less perfectly into different portions or fractions having more nearly unity of composition.

I have found in separating the different compounds from natural gas that good results are obtained by compressing the gas at the first stage to a pressure of 50 lbs. per sq. in. and reducing the temperature thereof to 60 F. degrees, and by compressing the second stage to 300 lbs. sq. in. pressure and reducing the temperature to 40 F. degrees, and increasing the pressure at the third stage to 650 lbs. per sq. in. and reducing the temperature to 32 F. degrees. It will be understood that these pressures and temperatures must be varied with reference to the gases being operated upon and the desired nature of the condensate. These reductions in temperature are partially produced by the expanding gases passing in countercurrent through the cooling coils 23, 17 and 9. The added cooling effect desired is accomplished through the cooling medium operating upon the cooling coils 6, 13 and 20. Ordinarily, this cooling medium may be a brine cooled in the ordinary methods used in ice machines.

What I claim as new is:

1. The art or process of condensing and separating differing compounds in natural gas in which there are different critical pressures and temperatures which consists in compressing and cooling the gas and collecting the liquid condensed and then compressing and cooling the gas residue and collecting the liquid from the residue.

2. The art or process of condensing and separating differing compounds in natural gas in which there are different critical pressures and temperatures which consists in compressing the gas in a plurality of stages, cooling the same at each stage and collecting the condensate for each stage separately.

3. The art or process of condensing and separating differing compounds in natural gas in which there are different critical pressures and temperatures which consists in compressing the gas in a plurality of stages and increasing the pressure at each stage, cooling the gas at each stage and collecting the condensate for each stage separately.

4. The art or process of condensing and separating different compounds in natural gas in which there are different critical pressures and temperatures which consists in compressing the gas in a plurality of stages and increasing the pressure with each stage and decreasing the temperature with each stage and collecting the condensate for each stage separately.

5. The art or process of condensing and separating differing compounds in natural gas in which there are different critical pressures and temperatures which consists in compressing and cooling the gas and collecting the liquid condensed and then compressing and cooling the gas residue and collecting the liquid from the residue, and causing the expanded residue of the gases to flow in countercurrent to and in heat interchanging relation with the compressed gases.

In testimony whereof I have hereunto set my hand in the presence of two subscribing witnesses.

FRANKLIN P. PETERSON.

Witnesses:
 WM. J SLOAN,
 BESS R. S. MCMULLEN.